United States Patent [19]

Marsico, Jr. et al.

[11] 3,864,359

[45] Feb. 4, 1975

[54] 5-AMINO-3-ETHYL-1-PHENYL-4-PYRAZOLECARBOXAMIDES AND METHOD OF PREPARATION THEREOF

[75] Inventors: Joseph William Marsico, Jr., Pearl River, N.Y.; Joseph Peter Joseph, Cliffside Park, N.J.; Leon Goldman, Nanuet, N.Y.

[73] Assignee: American Cyanamid Company, Stamford, Conn.

[22] Filed: May 3, 1973

[21] Appl. No.: 356,979

Related U.S. Application Data

[63] Continuation-in-part of Ser. No. 248,990, May 1, 1972, Pat. No. 3,760,082.

[52] U.S. Cl. ............................ 260/310 R, 424/273
[51] Int. Cl. ............................................. C07d 49/20
[58] Field of Search ............................... 260/310 R

[56] References Cited
UNITED STATES PATENTS

| | | | |
|---|---|---|---|
| 2,925,418 | 2/1960 | Druey et al. | 260/310 R |
| 2,965,643 | 12/1960 | Druey et al. | 260/310 R |
| 3,187,006 | 6/1965 | Druey et al. | 260/310 R |
| 3,487,083 | 12/1969 | Cresswell et al. | 310 R |

*Primary Examiner*—Natalie Trousof
*Attorney, Agent, or Firm*—Ernest Y. Miller

[57] ABSTRACT

The compounds 5-amino-3-ethyl-1-phenyl-4-pyrazolecarboxamide, 5-amino-1-(m-chlorophenyl)-3-ethyl-4-pyrazolecarboxamide, and 5-amino-3-ethyl-1-(m-fluorophenyl)-4-pyrazolecarboxamide, are described. They are useful as analgetic and antiinflammatory agents in warm-blooded animals.

5 Claims, No Drawings

5-AMINO-3-ETHYL-1-PHENYL-4-PYRAZOLECARBOXAMIDES AND METHOD OF PREPARATION THEREOF

DESCRIPTION OF THE INVENTION

The active components of this invention are 5-amino-3-ethyl-1-phenyl-4-pyrazolecarboxamides of the formula:

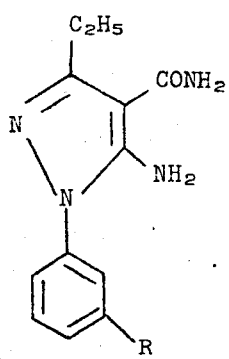

wherein R is hydrogen, chloro or fluoro, and non-toxic acid addition salts with acids such as hydrobromic, hydrochloric, phosphoric, sulfuric, citric, tartaric and the like.

The therapeutic compounds of the present invention are colorless crystalline solids which are soluble in organic solvents such as methanol, ethanol, acetone, ethyl acetate, benzene, propylene glycol and the like, but only very slightly soluble in water. The salts are soluble in water and in hydroxylic solvents.

The active components of the present invention are prepared by the reaction sequence shown as follows:

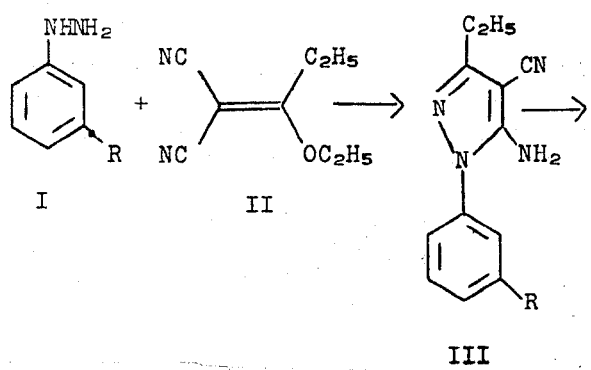

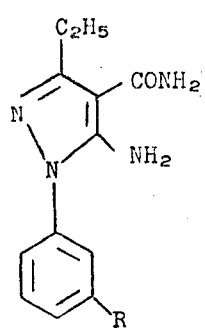

IV wherein R is hydrogen, chloro or fluoro.

The hydrazine (I) is condensed with (1-ethoxypropylidene)malonitrile (II) in an organic solvent such as ethanol to yield the 5-amino-3-ethyl-1-phenyl or (substituted phenyl)-4-pyrazolecarbonitrile (III) which is hydrolyzed to produce the desired 5-amino-3-ethyl-1-phenyl or (substituted phenyl)-4-pyrazolecarboxamide (IV). The hydrazine (I) may be used as the free base in the reaction or may be generated in situ by utilizing a mixture of the hydrazine (I) hydrochloride and sodium acetate. The hydrolysis of the carbonitrile (III) to the carboxamide (IV) may be accomplished with sodium hydroxide or with concentrated sulfuric acid. Acid addition salts of the pyrazolecarboxamides can be prepared by the treatment with acid such as mineral acids, for example hydrochloric acid to produce 5-amino-3-ethyl-1-phenyl-4-pyrazolecarboxamide hydrochloride, which is well known to those skilled in the art.

The 5-amino-3-ethyl-1-phenyl or (substituted phenyl)-4-pyrazolecarboxamides of the present invention are highly active analgetic agents in warm-blooded animals. They are useful in doses ranging from about 1 to 100 mg. per kilogram per day of warm-blooded animal. The preferred range of dose is usually 5 to 20 mg. per kilogram per day.

For therapeutic administration, the 5-amino-3-ethyl-1-phenyl or (substituted phenyl)-4-pyrazolecarboxamides of this invention may be incorporated with excipients and used, for example, in the form of tablets, dragees, capsules, suppositories, liquids, elixirs, emulsions, suspensions, syrups, chocolate, candy, wafers, chewing gum, solutions for parenteral administration, or the like. Such compositions and preparations should contain at least 0.1% of the active compound. The percentage in the composition and preparations may, of course, be varied, and may conveniently be between about 2% and 60% or more of the weight of the unit. The amount of a 5-amino-3-ethyl-1-phenyl or (substituted phenyl)-4-pyrazolecarboxamide in such therapeutically useful compositions or preparations is such that a suitable dosage will be obtained. This dosage can also be obtained by the use of sustained release preparations. Preferred compositions or preparations according to the present invention are prepared so that a dosage unit form contains between about 1 and about 250 milligrams of a 5-amino-3-ethyl-1-phenyl or (substituted phenyl)-4-pyrazolecarboxamide.

Tablets, pills, dragees, and the like may contain the following: a binder such as gum tragacanth, acacia, corn starch, or gelatin; a distintegrating agent such as corn starch, potato starch, alginic acid, or the like; a lubricant such as stearic acid, magnesium stearate, talc or the like; a sweetening agent such as sucaryl or saccharin may be added, as well as a flavoring such as peppermint, oil of wintergreen or cherry flavoring.

The active components of the present invention are active as analgetic agents when measured by the "writhing syndrome" test for analgetic activity as described by Siegmund et al., Proceedings of the Society for Experimental Biology and Medicine, Vol. 95, p. 729 (1957), with modifications. This method is based upon the reduction of the number of writhes following the intraperitoneal injection of one mg./kg. of body weight of phenyl-p-quinone in male Swiss albino mice weighing 15–25 grams per mouse. The syndrome is characterized by intermittent contractions of the abdomen, twisting and turning of the trunk, and extension of the hind legs beginning 3 to 5 minutes after injection of the phenyl-p-quinone. The test compound is administered orally to groups of two mice each 30 minutes before injection of the phenyl-p-quinone. The total number of writhes exhibited by each group of mice is recorded for a 3-minute period commencing 15 minutes after injection of the phenyl-p-quinone. A compound is considered active if it reduces the total number of writhes in two test mice from a control value of approximately 30 per pair to a value of 18 or less. The following Table I summarizes the relative activity of the present compounds as active analgetics, and compares them with the reference drug aspirin.

TABLE I

Analgetic Activity in the Antiwrithing Test

| Compound | Dose (Oral mg./kg. of Body Weight) | Number of Writhes Pair No. 1 | Pair No. 2 |
|---|---|---|---|
| 5-Amino-3-ethyl-1-phenyl-4-pyrazole-carboxamide | 100 | 0 | 3 |
| 5-Amino-3-ethyl-1-(m-fluorophenyl)-4-pyrazolecarboxamide | 100 | 4 | 8 |
| 5-Amino-3-ethyl-1-(m-chlorophenyl)-4-pyrazolecarboxamide | 100 | 9 | 5 |
| Aspirin | 100 | 1 | (historical average) |

Experiments are conducted to determine analgesia by a modification of the method of Randall and Selitto (Arch. Int. Pharmacodyn., 111:409–419, 1957). This method is used to measure the pain threshold of rats whose paws were made sensitive to pressure by injection of a 20% aqueous suspension (0.1 ml.) of brewers yeast into the plantar surface of the left hind paw. The pressure in grams which, when applied to the inflammed paw, elicits a sudden struggle or vocalization is recorded. A maximum (cutoff) pressure of 250 grams is employed. Control rats respond at a pressure of about 25 grams. A ratio of post/pretreatment reaction thresholds is calculated. The following Table II summarizes the results obtained by testing representative compounds.

TABLE II

Effect of Analgetic Compounds on the Pain Threshold of Rats with Inflamed Paws

| Compound | Oral Dose mg./kg. of Body Weight | Post-Treatment/Pre-Treatment Pressure Threshold (Average of 8 Rats Each Time Period) Hours After Treatment | | |
|---|---|---|---|---|
| | | 1 | 2 | 4 |
| 5-Amino-3-ethyl-1-phenyl-4-pyrazole-carboxamide | 200 | 3.7 | 1.8 | 1.7 |
| 5-Amino-3-ethyl-1-(m-fluorophenyl)-4-pyrazolecarboxamide | 200 | 1.9 | 2.7 | 1.4 |
| Aspirin | 200 | 1.1 | 1.1 | 1.6 |

In determining the acute anti-inflammatory activity of the present compounds Royal Hart, Wistar strain, rats ranging from 80 to 90 g. were used. The rats were fasted overnight prior to dosing but had free access to water. The drugs in aqueous suspension were administered by gavage in a volume of 1.7 ml./50 g. rat (corresponds to hydration volume used by Winter, et al., Proc. Soc. Exp. Biol. Med, 111, 544–547, 1962). The phlogistic agent used was carrageenin prepared as a sterile 1% suspension in 0.9% sodium chloride for routine testing. A volume of 0.05 ml. was injected through a 26 gauge needle into the plantar tissue of the right hind paw. Measurements were made 5 hours after drug administration (4 hours after carrageenin challenge) unless otherwise indicated. Volumes of both the normal and carrageenin inflamed feet were determined. The difference between the two measurements was considered to be the increased edema due to the carrageenin administration. Results were expressed as a C/T efficacy ratio (edema of control animals/edema of treated animals). The following Table III summarizes the results obtained with representative compounds of the present invention.

TABLE III

The effects of anti-inflammatory agents on carrageenin induced edema of the rat paw[1]

| Treatment | Oral Dose mg./kg. (pooled data) | No. Rats | Ratio control/treated edema[2] |
|---|---|---|---|
| Controls | — | 64 | — |
| Aspirin | 250 | 32 | 2.8 |
|  | 83 | 32 | 1.4 |
|  | 27 | 32 | 1.2 |
|  | 9 | 32 | 0.9 |
|  | 3 | 32 | 1.0 |
| Phenylbutazone | 250 | 32 | 2.3 |
|  | 83 | 32 | 2.4 |
|  | 27 | 32 | 1.7 |
|  | 9 | 32 | 1.3 |
|  | 3 | 32 | 1.3 |
| Indomethacin | 250 | 32 | 2.9 |
|  | 83 | 32 | 2.3 |
|  | 27 | 32 | 2.2 |
|  | 9 | 32 | 2.0 |
|  | 3 | 32 | 1.5 |
| 5-Amino-3-ethyl-1-phenyl-4-pyrazolecarboxamide | 250 | 8 | 5.92 |
| 5-Amino-1-(m-chlorophenyl)-3-ethyl-4-pyrazolecarboxamide | 125 | 8 | 3.63 |
| 5-Amino-3-ethyl-1-(m-fluorophenyl)-4-pyrazolecarboxamide | 250 | 8 | 8.10 |
|  | 83 | 8 | 3.50 |
|  | 27 | 8 | 1.70 |
|  | 9 | 8 | 1.40 |

[1] Rats fasted overnight prior to testing.
[2] Measurements made 5 hours after oral administration.

Tests to show activity against chronic inflammation in adjuvant arthritis were carried out. Groups of three Royal Hart Wistar strain rats, weighing 200 ± 10 g. each, were injected intradermally in the right hind paw with Freund's adjuvant (dried human tubercle bacilli in a mineral oil vehicle) at a dose of 2 mg./kg. of body weight. Test compounds were administered orally in a 1.5% starch vehicle at the indicated dosage in mg./kg. of body weight once daily on days 0 through 13 post-challenge. Control rats were treated in a similar manner, but given starch vehicle instead of the test compound. On the 14th and 21st day post-challenge the diameter of the injected paw (primary lesion) is measured by micrometer caliper, the volumes of inflamed paws are estimated from these measurements, and the results are expressed as percent inhibition of swelling as compared to controls at the same time, the other inflamed sites, such as ears, paws and tail (secondary lesions) are observed and the rat graded as to degree of inflammation and swelling present. The grading is based on a scale of 0 to 24.0, where 0 represents a complete absence of induced arthritis nodules and 24.0 represents the maximum degree of inflammation. The mean grade for each treated group is calculated and the effects of each representative compound tested are expressed as percent inhibition of the control grade. The following Table IV summarizes the results.

Table IV

The effect of anti-inflammatory agents on adjuvant arthritis of rats (treatment day 0 to day 13)

| Treatment | Oral dose mg./kg./day | Dead/treated at 21 days | Mean weight gain (gms.) | | % Inhibition of swelling (primary lesion) | |
|---|---|---|---|---|---|---|
| | | | Day 14 | Day 21 | Day 14 | Day 21 |
| Normal Rats | — | 4/51 | 69[a] | 110[a] | — | — |
| Adjuvant controls | — | 21/234 | 36 | 39 | 0 | 0 |
| Phenylbutazone | 150 | 0/18 | 45 | 50 | 80[a] | 44[a] |
|  | 75 | 2/18 | 57[a] | 54 | 72[a] | 23[a] |
|  | 37.5 | 2/18 | 47 | 50 | 67[a] | 19 |
| Aspirin | 400 | 4/18 | 48 | 57 | 76[a] | 68[a] |
|  | 200 | 1/18 | 31 | 27 | 51[a] | 36[a] |
|  | 100 | 7/18 | 42 | 49 | 40[a] | 21[a] |
| 5-Amino-3-ethyl-1-phenyl-4-pyrazolecarboxamide | 50 | 2/14 | 25 | 25 | 42[a] | 13 |
| 5-Amino-1-(m-chlorophenyl)-3-ethyl-4-pyrazolecarboxamide | 50 | 5/21 | 0 | 14 | 42[a] | 24 |
| 5-Amino-3-ethyl-1-(m-fluorophenyl)-4-pyrazolecarboxamide | 50 | 4/18 | −5[a] | 26 | 55[a] | 41[a] |
|  | 25 | 1/9 | 13[a] | 21 | 49[a] | 0 |
|  | 12.5 | 0/9 | 30 | 31 | 19 | 0 |

[a] Significantly different from adjuvant controls (p = < 0.05 by t test)

DETAILED DESCRIPTION

This invention is described in greater detail in con-

EXAMPLE 1

Preparation of 5-Amino-3-ethyl-1-phenyl-4-pyrazolecarbonitrile

A mixture of 22.5 g. of (1-ethoxypropylidene)-malononitrile, 21.7 g. of phenylhydrazine hydrochloride and 12.3 g. of sodium acetate in 300 ml. of absolute ethanol is heated under reflux for 24 hours. The solvent is removed under reduced pressure to give an oil which crystallizes on trituration with hexane. The crystals are removed by filtration, dissolved in methylene chloride, washed with water, dried over anhydrous magnesium sulfate and filtered through magnesium silicate to remove most of the color. Evaporation of the solvent under reduced pressure gives 20.3 g. of pink solid, melting point 130°–132° C. Recrystallization of a 5.0 g. sample from acetone-hexane gives 4.0 g. of 5-amino-3-ethyl-1-phenyl-4-pyrazolecarbonitrile as colorless crystals, melting point 132°–133° C.

EXAMPLE 2

Preparation of 5-Amino-3-ethyl-1-phenyl-4-pyrazolecarboxamide

To 3.5 ml. of stirred concentrated sulfuric acid is added, portionwise, 1.0 g. of pulverized 5-amino-3-ethyl-1-phenyl-4-pyrazolecarbonitrile. The reaction mixture is stirred 1 hour longer and then poured onto ice-water. A small amount of starting material separates and is removed by filtration. The filtrate is made basic with concentrated ammonium hydroxide and the resulting colorless crystals are removed by filtration, washed with water and dried to give 0.77 g. of product, melting point 152°–154° C. Recrystallization from acetone-hexane gives 0.60 g. of 5-amino-3-ethyl-1-phenyl-4-pyrazolecarboxamide as colorless crystals, melting point 155°–156° C.

EXAMPLE 3

Preparation of 5-Amino-3-ethyl-1-(m-fluorophenyl)-4-pyrazolecarbonitrile

A mixture of 24.4 g. of m-fluorophenylhydrazine hydrochloride, 22.5 g. of (1-ethoxypropylidene)-malononitrile and 12.3 g. of anhydrous sodium acetate in 300 ml. of absolute ethanol is refluxed for 23 hours, cooled and filtered. The filtrate is evaporated under reduced pressure to give a brown gummy residue. Crystallization from benzene gives, after filtration and washing with benzene, 22.2 g. of light tan crystals, melting point 128°–131° C. Recrystallization of a 5.00 g. sample from 50 ml. of benzene using activated charcoal gives 3.24 g. of 5-amino-3-ethyl-1-(m-fluorophenyl)-4-pyrazolecarbonitrile as colorless crystals, melting point 130°–132° C.

EXAMPLE 4

Preparation of 5-Amino-3-ethyl-1-(m-fluorophenyl)-4-pyrazolecarboxamide

A mixture of 6.50 g. of 5-amino-3-ethyl-1-(m-fluorophenyl)-4-pyrazolecarbonitrile, 140 ml. of 2N sodium hydroxide and 140 ml. of absolute ethanol is heated under reflux for 6.5 hours and then evaporated under reduced pressure until an oil separates. A few drops of ethanol are added and crystallization occurs. After chilling, the nearly colorless crystals are removed by filtration, washed with water and air-dried to give 5.25 g. of product, melting point 114°–116° C. The crystals are dissolved in dichloromethane and chromatographed over silica gel. The column is eluted with ether (200 ml. cuts) and cuts 3–9 are combined and the solvent is removed by evaporation under reduced pressure. The residual crystalline solid (4.37 g.) is recrystallized from acetone-hexane to give 2.79 g. of 5-amino-3-ethyl-1-(m-fluorophenyl)-4-pyrazolecarboxamide as colorless crystals, melting point 124.5°–126° C.

EXAMPLE 5

Preparation of 5-Amino-1-(m-chlorophenyl)-3-ethyl-4-pyrazolecarbonitrile

A mixture of 22.5 g. of (1-ethoxypropylidene)-malononitrile, 36.1 g. of m-chlorophenylhydrazine sulfate and 24.6 g. of sodium acetate in 300 ml. of absolute ethanol is heated under reflux for 24 hours. The mixture is evaporated under reduced pressure and the residue is dissolved in a mixture of water and benzene. The benzene layer is separated, washed with water, dried over magnesium sulfate and evaporated under reduced pressure to give 13.5 g. of a dark gum which solidifies. Two recrystallizations from acetone-hexane give 9.5 g. of 5-amino-1-(m-chlorophenyl)-3-ethyl-4-pyrazolecarbonitrile as colorless crystals, melting point 113°–115° C.

EXAMPLE 6

Preparation of 5-Amino-1-(m-chlorophenyl)-3-ethyl-4-pyrazolecarboxamide

To 25 ml. of stirred concentrated sulfuric acid is added, portionwise, 5.0 g. of pulverized 5-amino-1-(m-chlorophenyl)-3-ethyl-4-pyrazolecarbonitrile. The temperature is maintained at 25° to 40° C. and, after stirring for one hour, the reaction is worked up as in Example 2. In this way 3.8 g. of product, melting point 135°–137° C., is obtained. Recrystallization from acetone-hexane gives 5-amino-1-(m-chlorophenyl)-3-ethyl-4-pyrazolecarboxamide as colorless needles, melting point 137°–139° C.

EXAMPLE 7

Preparation of 50 gm. Tablets

| Per Tablet | | For 10,000 Tablets |
|---|---|---|
| 0.050 g. | 5-Amino-3-ethyl-1-(m-fluorophenyl)-4-pyrazolecarboxamide | 500 g. |
| 0.080 | Lactose | 800 |
| 0.010 | Corn Starch (For Mix) | 100 |
| 0.008 | Corn Starch (For Paste) | 80 |
| 0.148 g. | | 1480 g. |
| 0.002 g. | Magnesium Stearate | 20 |
| 0.150 g. | | 1500 g. |

The active ingredient, lactose and corn starch (for mix) are blended together. The corn starch (for paste) is suspended in 600 ml. of water, and heated with stirring, to form a paste. This paste is then used to granulate the mixed powders. Additional water is used, if necessary. The wet granules are passed through a No. 8 hand screen and dried at 120° F. The dry granules are then passed through a No. 16 screen. The mixture is lubricated with 1% magnesium stearate and compressed into tablets in a suitable tableting machine.

EXAMPLE 8

Preparation of Oral Syrup

| Ingredients | Amount |
| --- | --- |
| 5-Amino-3-ethyl-1-phenyl-4-pyrazolecarboxamide | 500 mg. |
| Sorbitol solution (70% N.F.) | 40 ml. |
| Sodium benzoate | 150 mg. |
| Saccharin | 10 mg. |
| Red Dye (F.D. & C No. 2) | 10 mg. |
| Cherry flavor | 50 mg. |
| Distilled water, q.s. ad | 100 ml. |

The sorbitol solution is added to 40 ml. of distilled water and the active ingredient is suspended therein. The saccharin, sodium benzoate, flavor and dye are added and dissolved in the above solution. The volume is adjusted to 100 ml. with distilled water. Each ml. of syrup contains 5 mg. of drug.

Other ingredients may replace those listed in the above formulation. For example, a suspending agent such as bentonite magma, tragacanth, carboxymethylcellulose or methylcellulose may be used. Phosphates, citrates or tartrates may be added as buffers. Preservatives may include the parabens, sorbic acid and the like and other flavors and dyes may be used in place of those listed above.

EXAMPLE 9

Preparation of Parenteral Solution

In a solution of 700 ml. of propylene glycol and 200 ml. of water for injection is dissolved 20.0 g. of 5-amino-3-ethyl-1-phenyl-4-pyrazolecarboxamide with stirring. After dissolution is complete, hydrochloric acid is added to adjust the pH to 5.5 and the volume is made up to 1,000 ml. with distilled water. The formulation is filtered through a 0.22 micron sterilizing filter, filled into 5.0 ml. ampoules, each containing 2.0 ml. (representing 40 mg. of drug), and sealed under nitrogen.

We claim:
1. A pyrazolecarboxamide of the formula:

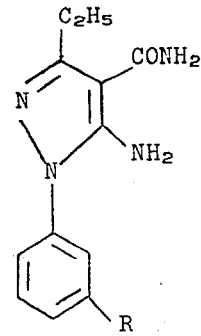

wherein R is hydrogen, chloro or fluoro, or non-toxic acid addition salt thereof.

2. The pyrazolecarboxamide in accordance with claim 1, 5-amino-3-ethyl-1-phenyl-4-pyrazolecarboxamide.

3. The pyrazolecarboxamide in accordance with claim 1, 5-amino-3-ethyl-1-(m-fluorophenyl)-4-pyrazolecarboxamide.

4. The pyrazolecarboxamide in accordance with claim 1, 5-amino-3-ethyl-1-phenyl-4-pyrazolecarboxamide hydrochloride.

5. The pyrazolecarboxamide in accordance with claim 1, 5-amino-1-(m-chlorophenyl)-3-ethyl-4-pyrazolecarboxamide.

* * * * *